(12) United States Patent
Mark et al.

(10) Patent No.: US 9,584,982 B2
(45) Date of Patent: Feb. 28, 2017

(54) CUSTOMER EXPECTATION TOKENS (71) Applicant: Bank of America Corporation, Charlotte, NC (US)

(72) Inventors: Timothy Mark, Berkeley, CA (US); Benjamin Porter, Huntersville, NC (US); Graham Wyllie, Charlotte, NC (US); Gregory Gunn, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 64 days.

(21) Appl. No.: 14/755,901

(22) Filed: Jun. 30, 2015

(65) Prior Publication Data
US 2017/0006433 A1   Jan. 5, 2017

(51) Int. Cl.
*H04W 4/04* (2009.01)
*H04W 12/06* (2009.01)

(52) U.S. Cl.
CPC ............. *H04W 4/04* (2013.01); *H04W 12/06* (2013.01)

(58) Field of Classification Search
CPC ................................ H04W 4/04; H04W 12/06
USPC ............. 455/41.1–41.2, 412.1–412.2, 414.1, 455/456.1–457, 466
See application file for complete search history.

(56) References Cited

U.S. PATENT DOCUMENTS

| | | | |
|---|---|---|---|
| 6,155,484 A | 12/2000 | Sasaki | |
| 6,857,562 B2 | 2/2005 | Sasaki | |
| 7,113,929 B1 | 9/2006 | Beach et al. | |
| 7,233,925 B1 | 6/2007 | Grandcolas et al. | |
| 7,319,987 B1 | 1/2008 | Hoffman et al. | |
| 7,320,072 B1 | 1/2008 | Cofta | |
| 7,346,846 B2 | 3/2008 | Rossi, Jr. et al. | |
| 7,523,859 B2 | 4/2009 | Patel et al. | |
| 7,908,222 B2 | 3/2011 | Grandcolas et al. | |
| 7,924,149 B2 | 4/2011 | Mendelson | |

(Continued)

*Primary Examiner* — Michael Mapa
(74) *Attorney, Agent, or Firm* — Banner & Witcoff, Ltd.; Michael A. Springs (57) ABSTRACT

Some aspects as disclosed herein are directed to, for example, a system, non-transitory computer readable medium, and method comprising receiving, at a computing device, a selection of an activity for a user to perform. The computing device may determine an estimated amount of time to complete the activity. A token for the activity may be generated, and generating the token may comprise initiating a timer for the activity. The computing device may determine a position of the user within a building location. Based on the timer and the position of the user, the computing device may determine that an amount of time to complete the activity is predicted to exceed the estimated amount of time to complete the activity by a threshold amount of time. In response to determining that the amount of time to complete the activity is predicted to exceed the estimated amount of time to complete the activity by the threshold amount of time, a notification may be generated, the notification indicating that the amount of time to complete the activity is predicted to exceed the estimated amount of time to complete the activity by the threshold amount of time. The notification may be sent to at least one of a mobile device associated with the user or an assistant's computing device at the building location.

20 Claims, 4 Drawing Sheets

(56) References Cited

U.S. PATENT DOCUMENTS

| | | |
|---|---|---|
| 8,073,756 B1 | 12/2011 | Lapsley et al. |
| 8,463,670 B2 | 6/2013 | Chaar et al. |
| 8,583,498 B2 | 11/2013 | Fried et al. |
| 8,584,251 B2 | 11/2013 | McGuire et al. |
| 8,630,932 B1 | 1/2014 | Lapsley et al. |
| 8,761,671 B2 | 6/2014 | Singer et al. |
| 8,896,485 B2 | 11/2014 | Mendelson |
| 9,098,961 B1* | 8/2015 | Block .................. G07F 19/206 |
| 2002/0052837 A1 | 5/2002 | Bouthors |
| 2003/0191989 A1* | 10/2003 | O'Sullivan ......... H04L 12/2697 |
| | | 714/47.2 |
| 2005/0137969 A1 | 6/2005 | Shah |
| 2005/0220046 A1 | 10/2005 | Falck et al. |
| 2008/0307243 A1* | 12/2008 | Lee ....................... G06F 1/3203 |
| | | 713/320 |
| 2009/0265775 A1 | 10/2009 | Wisely et al. |
| 2010/0121567 A1 | 5/2010 | Mendelson |
| 2011/0099104 A1 | 4/2011 | Nybom |
| 2013/0005253 A1* | 1/2013 | Grigg ................ G06Q 20/1085 |
| | | 455/41.1 |
| 2013/0054469 A1 | 2/2013 | Agashe et al. |
| 2013/0191662 A1* | 7/2013 | Ingrassia, Jr. ......... G06F 1/3206 |
| | | 713/320 |
| 2015/0018011 A1 | 1/2015 | Mendelson |
| 2015/0242215 A1* | 8/2015 | Bradbury ............ G06F 9/30087 |
| | | 712/231 |

\* cited by examiner

CUSTOMER EXPECTATION TOKENS

TECHNICAL FIELD

One or more aspects of the disclosure generally relate to computing devices, computing systems, and computer software. In particular, one or more aspects of the disclosure generally relate to computing devices, computing systems, and computer software that may be used to monitor the progress of a user's activity based on an electronic token.

BACKGROUND

Users may go to a location, such as a banking center, in order to perform transactions, such as deposit a check, open an account, and the like. However, the user might not know how long the user should expect to wait in a queue and might become frustrated if the wait is longer than expected. Customer surveys may be used to determine whether customers are satisfied or dissatisfied with the service or time spent waiting in the queue. However, these surveys are often sent days or weeks after the transaction, and the user might not respond to the survey or might not be able to provide accurate feedback.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects as disclosed herein are directed to, for example, a system, non-transitory computer readable medium, and method comprising receiving, at a computing device, a selection of an activity for a user to perform. The computing device may determine an estimated amount of time to complete the activity. A token for the activity may be generated, and generating the token may comprise initiating a timer for the activity. The computing device may determine a position of the user within a building location. Based on the timer and the position of the user, the computing device may determine that an amount of time to complete the activity is predicted to exceed the estimated amount of time to complete the activity by a threshold amount of time. In response to determining that the amount of time to complete the activity is predicted to exceed the estimated amount of time to complete the activity by the threshold amount of time, a notification may be generated, the notification indicating that the amount of time to complete the activity is predicted to exceed the estimated amount of time to complete the activity by the threshold amount of time. The notification may be sent to at least one of a mobile device associated with the user or an assistant's computing device at the building location.

Generating the token may comprise writing, to the token, data indicating the activity and the estimated amount of time to complete the activity. In some aspects, the method may comprise authenticating the user, and generating the token may comprise generating a temporary authentication session for the user. The temporary authentication session may be time-limited. Generating the token may also comprise writing, to the token, data indicating the temporary authentication session.

The token may comprise a near-field communication token, a radio-frequency identification (RFID) token, or a Bluetooth token. Additionally or alternatively, the token may comprise a virtual token stored on a mobile device of the user. If the token comprises a physical token, the method may comprise generating for display on an exit display device a satisfaction survey for the user in response to a determination that the physical token is returned by the user. If the token comprises a virtual token, the method may comprise generating for display on a mobile device of the user a satisfaction survey for the user in response to a determination that the user has completed the activity.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
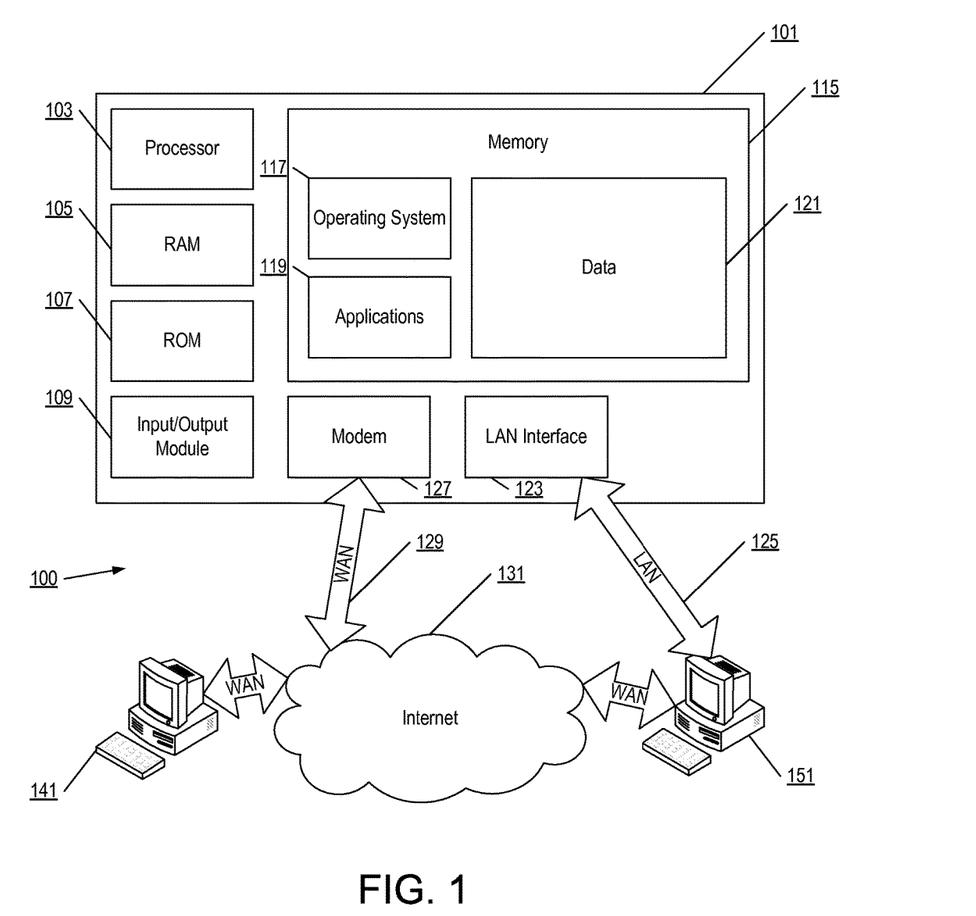
FIG. 1 illustrates an example operating environment in which various aspects of the disclosure may be implemented.

FIG. 1 illustrates an example block diagram of a computing device 101 (e.g., a computer server, desktop computer, laptop computer, tablet computer, and the like) in an example computing environment 100 that may be used according to one or more illustrative embodiments of the disclosure. The computing device 101 may have a processor 103 for controlling overall operation of the server and its associated components, including for example random access memory (RAM) 105, read-only memory (ROM) 107, input/output (I/O) module 109, and memory 115.

I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 115 and/or other storage to provide instructions to processor 103 for enabling computing device 101 to perform various functions. For example, memory 115 may store software used by the computing device 101, such as an operating system 117, application programs 119, and an associated database 121. Additionally or alternatively, some or all of the computer executable instructions for computing device 101 may be embodied in hardware or firmware (not shown).

The computing device 101 may operate in a networked environment supporting connections to one or more remote computers, such as terminals 141 and 151. The terminals 141 and 151 may be personal computers or servers that include any or all of the elements described above with respect to the computing device 101. The network connections depicted in FIG. 1 include a local area network (LAN) 125 and a wide area network (WAN) 129, but may also include other networks. When used in a LAN networking environment, the computing device 101 may be connected to the LAN 125 through a network interface or adapter 123. When used in a WAN networking environment, the computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 101 and/or terminals 141 or 151 may also be mobile terminals (e.g., mobile phones, smartphones, PDAs, notebooks, tablets, and the like) including various other components, such as a battery, speaker, and antennas (not shown).

The disclosure is operational with numerous types of general purpose or special purpose computing devices. Examples of well-known computing devices that may be suitable for use with the disclosure (including the system of FIG. 1) include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 2:
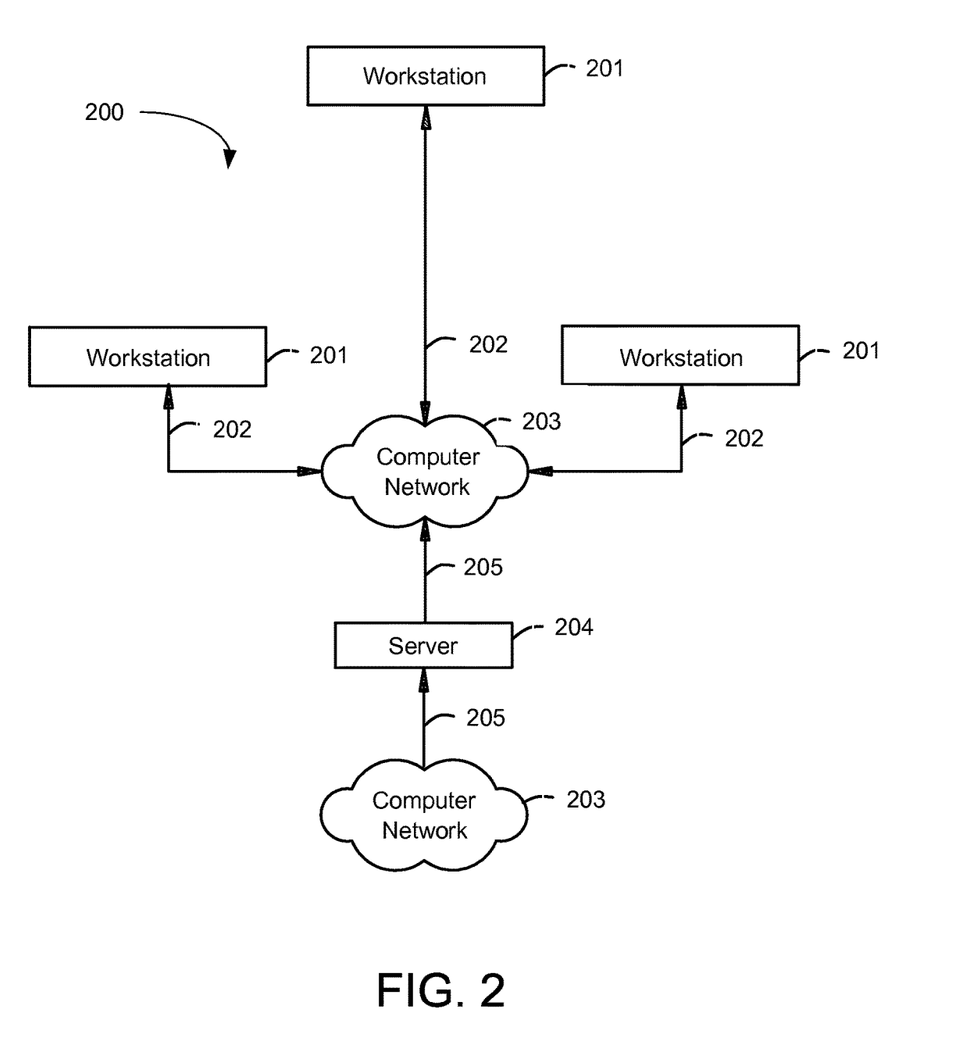
FIG. 2 illustrates another example operating environment in which various aspects of the disclosure may be implemented.

FIG. 2 illustrates another example operating environment in which various aspects of the disclosure may be implemented. An illustrative system 200 for implementing methods according to the present disclosure is shown. As illustrated, system 200 may include one or more workstations 201. The workstations 201 may be used by, for example, agents or other employees of an institution (e.g., a financial institution) and/or customers of the institution. Workstations 201 may be local or remote, and are connected by one or more communications links 202 to computer network 203 that is linked via communications links 205 to server 204. In system 200, server 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

Figure 3:
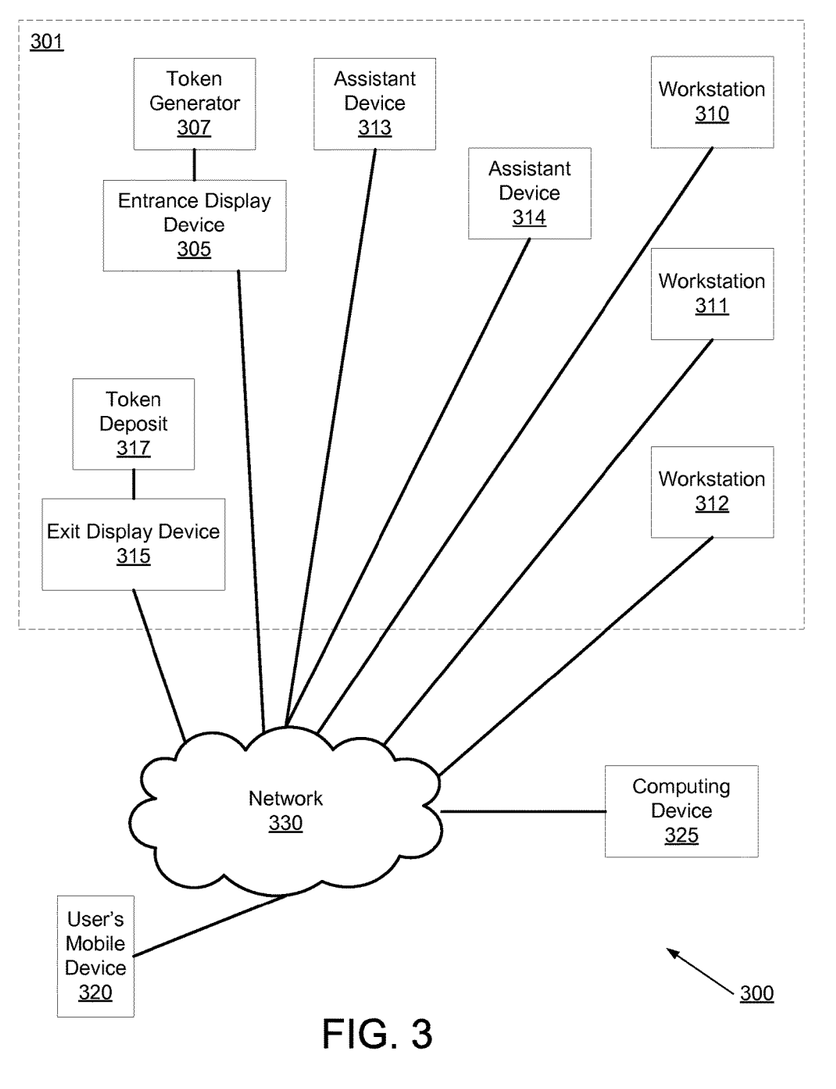
FIG. 3 illustrates yet another example operating environment in which various aspects of the disclosure may be implemented.

FIG. 3 illustrates yet another example operating environment in which various aspects of the disclosure may be implemented. The operating environment 300 may comprise one or more locations, such as the location 301. The location 301 may comprise, for example, a transaction center (e.g., a financial center, such as a banking center) having one or more devices, such as an entrance display device 305, a token generator 307, one or more workstations 310, 311, and 312, one or more assistant devices 313 and 314, an exit display device 315, and/or a token deposit 317.

The entrance display device 305 may comprise the computing device 101. The entrance display device 305 may have a display, such as a touch screen display, to facilitate interactions with users that enter the location 301. As will be described in further detail in the examples below, a user visiting the location 301 may indicate, via an interface displayed by the entrance display device 305, the activity or activities the user would like to perform during the visit. The user may also input a timeframe that the user expects to complete the activity. Additional functions or steps performed by the entrance display device 305 will be described in further detail in the examples below.

The entrance display device 305 may communicate with a token generator 307, such as via a network connection or local connection. The token generator 307 may generate a physical token, such as a tag, for the activity and user. Exemplary physical tokens include, but are not limited to, a near-field communication (NFC) tag, a radio-frequency identification (RFID) tag, a Bluetooth transmitter and/or receiver, or any other physical device that can wirelessly communicate with one or more sensors, readers, or writers. The token generator 307 may write or otherwise program information onto each token. For example, the token generator 307 may wirelessly send information via RF to a token, and the token may store the information in local memory. Other information on the token (e.g., a previous user's information) may be overwritten. The token may store (or otherwise have access to) information identifying the user and/or the activity selected by the user. As will be described in further detail below, the token may serve multiple purposes, including monitoring the amount of time the user spends waiting for or performing the activity, storing an authentication session for the user, and initiating the generation of a customer survey for the user.

The workstations 310, 311, and 312 may be used by employees at the location 301 to facilitate transactions with users. The workstations 310, 311, and 312 may comprise the workstations 201 illustrated in FIG. 2. In some aspects, the each workstation may correspond to a separate queue. For example, the location 301 may have three queues, each queue corresponding to a particular workstation 310, 311, and 312. All of the queues at the location 301 may be open, or one or more of the queues may be closed.

The assistant devices 313 and 314 may be used by employees at the location 301 to monitor the queues and/or customer expectations at the location 301. For example the assistant device 313 may comprise a tablet device, a smartphone, a laptop computer, or any other mobile device. The assistant device 313 may have a display screen, which may comprise a touchscreen or non-touchscreen display. The assistant device may comprise input and/or output devices that may be used by the employee to monitor each user's elapsed time and receive notifications that a user's predicted elapsed time will exceed an expected amount of time, among other capabilities (as will be described in further detail below). Exemplary input and/or output devices of the assistant device include, but are not limited to, the touchscreen display, a keyboard, a mouse, a keypad, or other buttons.

The exit display device 315 may comprise the computing device 101. The exit display device 315 may have a display, such as a touch screen display, to facilitate interactions with users that exit the location 301. As will be described in further detail in the examples below, the exit display device 315 may display one or more customer survey questions to users exiting the location 301 to gauge the level of satisfaction of the wait time, transaction time, or service at the location 301. Additional functions or steps performed by the exit display device 315 will be described in further detail in the examples below. In some aspects, the exit display device 315 may generate and/or display the survey questions in response to the token deposit 317 receiving a token from the user.

The exit display device 315 may communicate with a token deposit 317, such as via a network connection or local connection. The token deposit 317 may wirelessly read or otherwise receive information from each token in its proximity (e.g., deposited into the deposit 317). For example, the token deposit 317 may wirelessly receive information via RF signals from the token. In some aspects, the token deposit 317 may erase or otherwise rewrite the information on the token to protect the user's information or to prepare the token for future user.

The operating environment 300 may comprise a user's mobile device 320. For example the mobile device 320 may comprise a tablet device, a smartphone, a smartwatch, or any other mobile device. The mobile device 320 may include an application displaying an interface for the user to authenticate by providing credentials. The mobile device 320 may also be used as a virtual token to monitor the progress of the user's activity, as will be described in further detail below. In other words, the mobile device 320 may serve the function of a physical token. The mobile device 320 may also be used to display a survey after the user completes the transaction, as will be described in further detail below.

The operating environment 300 may comprise a computing device 325, which may comprise any of the computing devices described herein. For example, the computing device 325 may comprise the computing device 101 illustrated in FIG. 1 or the server 204 illustrated in FIG. 2. The computing device 325 may monitor and/or manage the elapsed time for each user at the location 301. The computing device 325 may also generate various interfaces for display on the entrance display device 305, the exit display device 315, the assistant devices 313 and 314, and/or the user's mobile device 320, as will be described in further detail below. The computing device 325 may also facilitate communications between any of the devices at the location 301 or devices outside the location 301 (e.g., the user's mobile device 320). Various methods performed by the computing device 325 will be described in further detail in the examples below.

Any of the devices illustrated in FIG. 3, such as the entrance display device 305, the exit display device 315, the assistant devices 313 and 314, and the workstations 310, 311, and 312 may communicate via a network 330, which may comprise any of the networks previously described, such as the Internet, a LAN, a WAN, and the like. The network 330 may comprise a plurality of network connections between any of the above-described devices.

Figure 4:
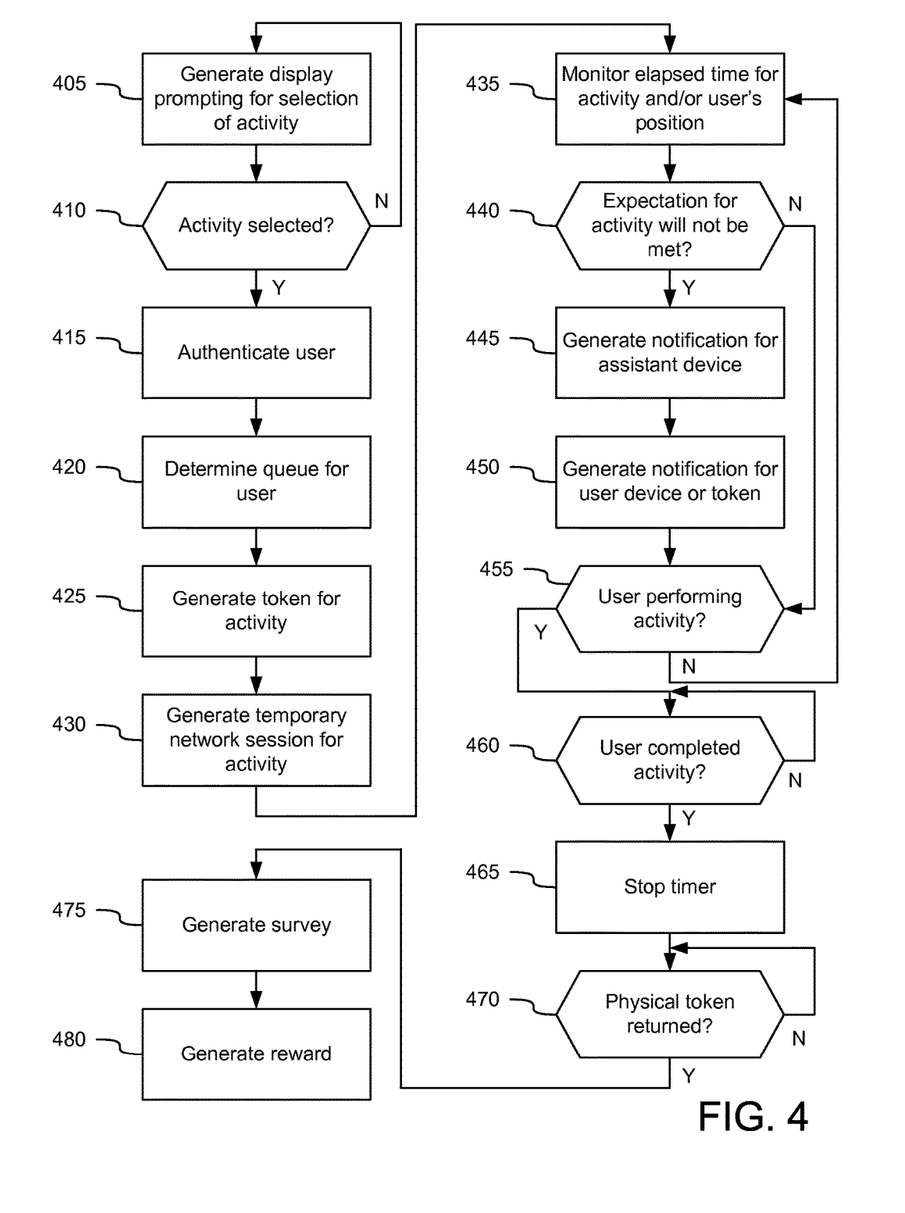
FIG. 4 illustrates an example of at least a portion of a flow diagram for managing customer expectation tokens in which various aspects of the disclosure may be implemented.

FIG. 4 illustrates an example of at least a portion of a flow diagram for managing customer expectation tokens in which various aspects of the disclosure may be implemented. In step 405, the computing device may generate an interface for display on a display prompting a user to input one or more activity (e.g., a transaction) that the user desires to perform. The interface may be displayed on a display of the user's device 320 or a display at the activity location, which may comprise a large, touch screen display (e.g., the entrance display device 305). The interface may list a plurality of activities that the user can perform, such as in a list format or as a drop-down menu. Additionally or alternatively, the interface may include a search bar that allows the user to input text to search for a desired activity.

The interface may display a time associated with the selected or each displayed activity. Each activity may be estimated to take a certain amount of time. The estimated time may be based on a predetermined value, such as 5 minutes for the user to perform a first type of activity, 7 minutes for the user to perform a second type of activity, 2 minutes for the user to perform a third type of activity, and so on. The predetermined value may be stored in a database, and the computing device may retrieve the predetermined value to be displayed concurrently with the displayed activities or the activity selected by the user.

Alternatively, each activity may historically take a certain amount of time to complete. For each activity type, the computing device may track the amount of time taken to complete the activity. For subsequent activities of the same type, the computing device may estimate the amount of time that the activity is expected to take. For example, the computing device may take the average or median of the historical time values. The historical estimate may be stored in the database, and the computing device may retrieve the historical estimate to be displayed concurrently with the displayed activities or the activity selected by the user.

The interface may also display an input field for the user to input the amount of time the user expects the activity to take or the maximum amount of time the user would be willing for the activity to take. If the estimated amount of time to complete the activity is greater than the amount of time input by the user, the user's device 320 or the entrance display device 305 at the location 301 may display a warning and/or indicate how much more time the activity is expected to take. In some aspects, the interface may display an option requesting the user to indicate that the excess amount of time is okay.

In step 410, the computing device may determine whether the user selected an activity to perform (and optionally input a time estimate). If not (step 410: N), the user may proceed to wait in a queue for his or her desired activity without first indicating the activity. If the user selected an activity (step 410: Y), the computing device may proceed to step 415.

In step 415, the user may be authenticated. For example, the entrance display device of the user's device may prompt for and the user may provide credentials if the user is a customer of the institution. Exemplary credentials include, but are not limited, to a username and password, a passcode, biometrics, a debit or credit card, a bank card, and the like. In some aspects, if the user is authenticated at the user's device or the entrance display device, the authentication may apply to the activity that the user desires to perform once the user reaches the service counter or corresponding workstation. In other words, the user might not have to perform a second authentication at the service counter in order to perform the activity. As will be described in further detail below, authentication information may be stored on a physical or virtual token generated for the user. If the user is not a customer, the user may skip the authentication step.

In step 420, the computing device may optionally determine a queue for the user to enter. For example, assume that the building location 301 includes three different queues. Each queue may be distinguished by, for example, number (e.g., queue 1, queue 2, and queue 3) or color (e.g., a red queue, a blue queue, and a white queue). The computing device may generate for display on the entrance display (or on the user's device) the queue for the user to enter. In some aspects, the selected queue may depend on the user's selected activity. For example, if the user selected activity 4, activity 5, or activity 7, the computing device may determine to place the user in queue 1 and generate a display instructing the user to enter queue 1. If the user selected activity 1 or activity 3, the computing device may determine to place the user in queue 2 and generate a display instructing the user to enter queue 2. If the user selected activity 2 or activity 6, the computing device may determine to place the user in queue 3 and generate a display instructing the user to enter queue 3. If the building location only has one queue, the computing device might not perform step 420.

The queue that the user is placed in may also be determined based on the expected amount of time for the activity. If the amount of time for the user's activity is expected to exceed a threshold amount, the user may be placed in a first queue. On the other hand, if the amount of time does not exceed a threshold, the user may be placed in a second queue. The second queue might be for users whose activities are not expected to exceed the threshold, whereas the first queue might be for users whose activities are expected to exceed the threshold. Alternatively, the second queue might currently be shorter than the first queue, or the wait time for the second queue might be shorter than the first queue. By placing users which shorter activities (e.g., activities that do not exceed the threshold) in the second queue, those users may be moved through the system quicker because they have shorter transactions and might expect to wait for a shorter period of time. The users with longer activities (e.g., activities that do exceed the threshold) in the first queue may be moved through the system a little more slowly because they might expect to wait a little longer to complete their activities.

In step 425, the computing device may generate a token containing the information selected by the user (e.g., the activity type and/or one or more associated time frames). The token may also include other information associated with the user, the location of the activity, the queue selected by the computing device, and/or authentication information. For example, if the user is signed on to the corresponding application on the user's device, the computing device may retrieve information on the user (e.g., name, username, address, account number, and the like) from a database. The information may be used to facilitate the activity to be performed by the user. The information may also identify the location 301 of the activity, such as a banking center identifier. The information may also identify the queue selected by the computing device for the user (if applicable). The user's authentication information, such as user credentials, may also be stored in an encrypted format on the token. The encryption information may be time limited, such as for 10 minutes or 20 minutes. When the authenticated user reaches the service counter, the user may be automatically authenticated by the token, and the user might not have to provide credentials a second time. For example, once the token is a certain distance from the service counter, the token may wirelessly send the authentication information to an RF receiver at the service counter. The RF receiver and/or corresponding computing device may authenticate the user based on the received authentication information.

As previously explained, the token may comprise a physical token, such as a near-field communication (NFC) tag, a radio-frequency identification (RFID) tag, a Bluetooth transmitter and/or receiver, or any other physical device that can wirelessly communicate with one or more sensors or readers. Additionally or alternatively, the token may comprise a virtual token, such as a virtual token on an application running on the user's device. In other words, the user's device may be registered as a temporary token. Accordingly, the user might not have to carry a physical token with him or her while waiting for the activity.

In step 430, the computing device, in response to generating the token, may generate a temporary network session for the activity. The temporary session may be used by assistants at the location to facilitate the user's activity. For example, one or more of the assistants at the location may have an assistant device, such as a smartphone or a tablet. The information included in the generated token may be displayed on a display of the assistant's device. For example, the assistant's computing device may display the activity selected by the user, one or more times associated with the activity, an identifier for the building location, and the like. Within the temporary user session, the computing device may also generate and initiate a timer used to measure the elapsed time (e.g., waiting time) for the user. The elapsed time may also be tracked in the user session and displayed on one or more assistant's devices so that the assistants' devices may be used as a means to facilitate meeting the user's expectations. The user may enter a queue after the user receives his or her physical or virtual token.

In step 435, the computing device may monitor the elapsed time on the timer for each user at the building location and/or the user's position in a particular queue. The user's position may be determined based on, for example, the location of the physical token or the location of the user's device within the building (e.g., if a virtual token is used). Each location may be determined using wireless RF signals sent and/or received from the token or user device (e.g., GPS, Wi-Fi, cellular, and the like). As explained above, the computing device may also send the elapsed time for display on assistants' devices at the location so that assistants may also monitor the user's position and elapsed time.

In step 440, the computing device may determine whether the user's position indicates that the user's expectation for wait and/or transaction time might not be met. For example, each queue may be segmented by distance from the counter or other service area where the user can perform his or her desired transaction. Each segment may correspond to a predicted wait time. In other words, the average user might be predicted to wait a certain amount of time in each segment before the user is able to reach the service area. For example, if the user is in a first segment of the queue, the user might be predicted to wait 1 minute. If the user is in the next segment of the queue, the user might be predicted to wait 2 minutes. If the user is in the third segment of the queue, the user might be predicted to wait 3 minutes, and so on.

Alternatively, the predicted wait time may be based on the number of people in front of the user in the queue, with a fixed amount of time added for each successive person in the queue. For example, the person first in the queue (but not at the service counter) might be predicted to wait 30 seconds. The person second in the queue might be predicted to wait 1 minute. The person third in the queue might be predicted to wait 1 minute and 30 seconds, and so on.

The computing device may determine the total wait time based on the elapsed time (tracked by the timer described above) and the user's location (e.g., the segment or number in the queue). The total wait time may be dynamic, such as if the activity of a person in front of the user is much shorter than expected or is much longer than expected. Accordingly, the computing device may periodically recalculate the total wait time. If the total wait time exceeds the estimate given to the user before entering the queue by a predetermined amount, the computing device may determine, in step 440, that the user's expectation for wait time might not be met (step 440: Y).

In step 445, the computing device may generate a message indicating that the user's expectation might not be met and send the message to one or more of the assistants' devices. The application running on the assistants' devices may display the message, and an assistant may endeavor to have the user's expectations met or otherwise let the user know that the user's expectation for wait time likely will not be met. For example, the assistant may move the user ahead in the queue, or the assistant may open up a new queue for the user (and other users) to ensure that their expectations are met.

In step 450, the computing device may optionally generate a message to send to the user's device or the physical token, such as if the physical token includes a display or other output device. The user's device or physical token may display the message to the user and accordingly may be used to notify the user of a delay.

In some aspects, the user's activity might not require the user to enter a queue (e.g., a user may go to a waiting area in order to open a money market savings account). If the user nevertheless enters a queue, one or more of the assistants' devices may be notified by the computing device that the user entered a queue even though the user should have gone to the waiting area. The assistant may approach the user and direct the user to the waiting area. The same may be done if the user enters the wrong queue, such as if the user was instructed to enter the first queue, but instead entered the second queue.

In step 455, the computing device may determine whether the user is at the service counter and performing the desired activity. For example, the computing device may determine the user's location based on the location of the physical token or user device, as previously described. Alternatively, the computing device may receive from, for example, a workstation at the service counter indicating that a user has been authenticated and is performing the desired activity. As previously explained, the user may be automatically authenticated by the token, and the user might not have to provide credentials a second time. For example, once the token is a certain distance from the service counter, the token may wirelessly send the authentication information to an RF receiver at the service counter or workstation. The RF receiver and/or corresponding computing device (e.g., the workstation) may authenticate the user based on the received authentication information.

In step 460, the computing device may determine whether the user has completed the activity, such as the cash withdrawal, the check deposit, and the like. Once the user has completed the activity (step 460: Y), in step 465, the computing device may stop the timer tracking the user's elapsed wait and/or transaction time. The computing device may use the elapsed time to update the expected (e.g., historical) time to complete an activity of the same type. For example, the user's elapsed time may be included in calculating the median or average time for that transaction. The new estimate may be provided to future users indicating a desire to perform that transaction. The computing device may also determine whether the elapsed time exceeded the time input by the user and/or the expected time. The customer's level of satisfaction with the service and/or the elapsed time may be collected.

In step 470, the computing device may optionally determine whether a physical token, if one was used, was returned by the user. For example, one or more token deposit 317 (e.g., boxes) may be placed at the location 301, such as near the service counter, near the building exit, or any other location. The token return container may include an RF reader, such as an NFC reader, an RFID reader, a Bluetooth reader, and the like. The type of reader may correspond to the type of RF communication utilized by the token (e.g., an NFC reader for an NFC token, an RFID reader for an RFID token, and the like). The reader 317 may determine that the token was returned if it is able to communicate with the token, such as via a handshake or other communication.

In some aspects, the location may comprise a plurality of token return containers. For example, one token return container may be used to indicate that the user was satisfied with the elapsed time and/or the customer service. Another token return container may be used to indicate that the user was not satisfied. Yet other token return containers may be used if several levels of satisfaction are provided (e.g., highly unsatisfied, unsatisfied, satisfied, and/or highly satisfied).

In step 475, the computing device may generate a survey in response to the user returning the physical token. For example, a computing device with a display screen may be positioned adjacent to the token return box. In some aspects, the computing device may communicate with the token return box. In response to the reader determining that a token was returned, the computing device may generate for display on its display screen a survey for the user to complete. For example, the survey may request the user to input the level of satisfaction for the service provided. The survey may also request for the user to input the level of satisfaction for the wait time, the activity time, and/or the total elapsed time. The survey may also display one or more other questions for the user, and/or a comments section for the user to provide additional comments on the transaction.

If a virtual token, such as the user's mobile device, is used instead of a physical token, the computing device may generate the survey for display on the user's mobile device. For example, the survey may be displayed via the application running on the user's mobile device. The survey may be generated in response to the computing device determining that the user has completed the desired activity (e.g., in step 460 described above).

In step 480, the computing device may generate a reward for the user and optionally display the reward on the user's mobile device or on the display of the exit display device 315. In some aspects, the reward may be generated in response to the user returning the physical token or completing the survey. Accordingly, a reward may be used to incentivize the user to take the survey or to return the physical token. Exemplary rewards include, but are not limited to, a complimentary monetary deposit into the user's account, a coupon for a local shop, or a discount on a future transaction. In some aspects, the computing device may randomly select users that return tokens or complete surveys for rewards. The computing device might use a conventional random or pseudorandom binary generator to determine which users should receive a reward. For example, a '1' may indicate that the user will receive a reward, and a '0' may indicate that the user will not receive a reward.

Various aspects described herein may be embodied as a method, an apparatus, or as computer-executable instructions stored on one or more non-transitory and/or tangible computer-readable media. Accordingly, those aspects may take the form of an entirely hardware embodiment, an entirely software embodiment (which may or may not include firmware) stored on one or more non-transitory and/or tangible computer-readable media, or an embodiment combining software and hardware aspects. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, at a computing device, a selection of an activity for a user to perform;
   determining, by the computing device, an estimated amount of time to complete the activity;
   generating a token for the activity, wherein generating the token comprises initiating a timer for the activity;
   determining, by the computing device, a position of the user within a building location;
   based on the timer and the position of the user, determining, by the computing device, that an amount of time to complete the activity is predicted to exceed the estimated amount of time to complete the activity by a threshold amount of time; and
   in response to determining that the amount of time to complete the activity is predicted to exceed the estimated amount of time to complete the activity by the threshold amount of time, generating a notification indicating that the amount of time to complete the activity is predicted to exceed the estimated amount of time to complete the activity by the threshold amount of time, wherein the generated token and the notification are provided to the user, and the generated token is used for the activity.

2. The method of claim 1, further comprising:
   sending the notification to at least one of a mobile device associated with the user or an assistant's computing device at the building location.

3. The method of claim 1, wherein generating the token comprises writing, to the token, data indicating the activity and the estimated amount of time to complete the activity.

4. The method of claim 1, further comprising:
   authenticating the user,
   wherein generating the token comprises:
      generating a temporary authentication session for the user, wherein the temporary authentication session is time-limited; and
      writing, to the token, data indicating the temporary authentication session.

5. The method of claim 1, wherein the token comprises a near-field communication token, a radio-frequency identification (RFID) token, or a Bluetooth token.

6. The method of claim 1, wherein the token comprises a virtual token stored on a mobile device of the user.

7. The method of claim 1, further comprising performing one or more of the following:
   when the token comprises a physical token, generating for display on an exit display device a satisfaction survey for the user in response to a determination that the physical token is returned by the user; or
   when the token comprises a virtual token, generating for display on a mobile device of the user a satisfaction survey for the user in response to a determination that the user has completed the activity.

8. An apparatus, comprising:
   a processor; and
   memory storing computer-executable instructions that, when executed by the processor, cause the apparatus to:
      receive a selection of an activity for a user to perform;
      determine an estimated amount of time to complete the activity;
      generate a token for the activity, wherein generating the token comprises initiating a timer for the activity;
      determine a position of the user within a building location;
      based on the timer and the position of the user, determine that an amount of time to complete the activity is predicted to exceed the estimated amount of time to complete the activity by a threshold amount of time; and
      in response to determining that the amount of time to complete the activity is predicted to exceed the estimated amount of time to complete the activity by the threshold amount of time, generate a notification indicating that the amount of time to complete the activity is predicted to exceed the estimated amount of time to complete the activity by the threshold amount of time, wherein the generated token and the notification are provided to the user, and the generated token is used for the activity.

9. The apparatus of claim 8, wherein the memory stores additional computer-executable instructions that, when executed by the processor, cause the apparatus to:
   send the notification to at least one of a mobile device associated with the user or an assistant's computing device at the building location.

10. The apparatus of claim 8, wherein generating the token comprises writing, to the token, data indicating the activity and the estimated amount of time to complete the activity.

11. The apparatus of claim 8, wherein the memory stores additional computer-executable instructions that, when executed by the processor, cause the apparatus to:
    authenticate the user,
    wherein generating the token comprises:
       generating a temporary authentication session for the user, wherein the temporary authentication session is time-limited; and
       writing, to the token, data indicating the temporary authentication session.

12. The apparatus of claim 8, wherein the token comprises a near-field communication token, a radio-frequency identification (RFID) token, or a Bluetooth token.

13. The apparatus of claim 8, wherein the token comprises a virtual token stored on a mobile device of the user.

14. The apparatus of claim 8, wherein the memory stores additional computer-executable instructions that, when executed by the processor, cause the apparatus to perform one or more of the following:
  when the token comprises a physical token, generate for display on an exit display device a satisfaction survey for the user in response to a determination that the physical token is returned by the user; or
  when the token comprises a virtual token, generate for display on a mobile device of the user a satisfaction survey for the user in response to a determination that the user has completed the activity.

15. A non-transitory computer-readable medium having instructions stored thereon that, when executed, cause a computing device to:
  receive a selection of an activity for a user to perform;
  determine an estimated amount of time to complete the activity;
  generate a token for the activity, wherein generating the token comprises initiating a timer for the activity;
  determine a position of the user within a building location;
  based on the timer and the position of the user, determine that an amount of time to complete the activity is predicted to exceed the estimated amount of time to complete the activity by a threshold amount of time; and
  in response to determining that the amount of time to complete the activity is predicted to exceed the estimated amount of time to complete the activity by the threshold amount of time, generate a notification indicating that the amount of time to complete the activity is predicted to exceed the estimated amount of time to complete the activity by the threshold amount of time, wherein the generated token and the notification are provided to the user, and the generated token is used for the activity.

16. The non-transitory computer-readable medium of claim 15 having additional computer-readable instructions stored thereon that, when executed, cause the computing device to:
  send the notification to at least one of a mobile device associated with the user or an assistant's computing device at the building location.

17. The non-transitory computer-readable medium of claim 15, wherein generating the token comprises writing, to the token, data indicating the activity and the estimated amount of time to complete the activity.

18. The non-transitory computer-readable medium of claim 15 having additional computer-readable instructions stored thereon that, when executed, cause the computing device to:
  authenticate the user,
  wherein generating the token comprises:
    generating a temporary authentication session for the user, wherein the temporary authentication session is time-limited; and
    writing, to the token, data indicating the temporary authentication session.

19. The non-transitory computer-readable medium of claim 15, wherein the token comprises a near-field communication token, a radio-frequency identification (RFID) token, or a Bluetooth token.

20. The non-transitory computer-readable medium of claim 15, wherein the token comprises a virtual token stored on a mobile device of the user.

\* \* \* \* \*